United States Patent
Chopra et al.

(10) Patent No.: US 11,099,946 B1
(45) Date of Patent: Aug. 24, 2021

(54) DIFFERENTIAL RESTORE USING BLOCK-BASED BACKUPS

(71) Applicant: EMC IP Holding Company LLC, Hopkinton, MA (US)

(72) Inventors: Shelesh Chopra, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 606 days.

(21) Appl. No.: 14/297,467

(22) Filed: Jun. 5, 2014

(51) Int. Cl.
*G06F 11/00* (2006.01)
*G06F 11/14* (2006.01)

(52) U.S. Cl.
CPC ................. *G06F 11/1469* (2013.01)

(58) Field of Classification Search
CPC ...... G06F 11/00; G06F 11/07; G06F 11/1402; G06F 11/1446; G06F 11/1448; G06F 11/1458
USPC ....................................................... 714/1–57
See application file for complete search history.

(56) References Cited

U.S. PATENT DOCUMENTS

| | | | | |
|---|---|---|---|---|
| 7,330,997 B1 * | 2/2008 | Odom | ................. | G06F 11/1464 711/162 |
| 7,356,727 B1 * | 4/2008 | McGhee | ............. | G06F 11/1433 714/2 |
| 7,672,979 B1 * | 3/2010 | Appellof | ............. | G06F 11/1435 707/649 |
| 7,761,678 B1 * | 7/2010 | Bodmer | ............. | G06F 11/3485 711/114 |
| 8,260,750 B1 * | 9/2012 | Gugick | ............... | G06F 11/1451 707/645 |
| 8,429,359 B1 | 4/2013 | Desai et al. | | |
| 2006/0218363 A1 | 9/2006 | Palapudi | | |
| 2010/0070475 A1 * | 3/2010 | Chen | ................... | G06F 11/1451 707/640 |
| 2011/0218967 A1 * | 9/2011 | Sliger | ..................... | G06F 12/00 707/647 |
| 2012/0017114 A1 * | 1/2012 | Timashev | ........... | G06F 11/1469 714/15 |
| 2012/0143825 A1 | 6/2012 | Boehm | | |
| 2013/0262925 A1 * | 10/2013 | Dhanalakoti | ....... | G06F 11/1415 714/16 |
| 2014/0149791 A1 * | 5/2014 | Goodman | ........... | G06F 11/1451 714/15 |

(Continued)

OTHER PUBLICATIONS

Author Unknown, VMware KB: Changed Block Tracking (CBT) on Virtual Machines, http://kb.vmware.com/selfservice/microsites/search.do?language=en_US&cmd=displayKC&externalId=1020128, Nov. 21, 2013.

*Primary Examiner* — Sarai E Butler
(74) *Attorney, Agent, or Firm* — Krishnendu Gupta; Nikhil Patel

(57) ABSTRACT

Differential restore using block-based backups is disclosed. Block restore information identifying blocks in a volume that have changed since a backup time may be determined. The block restore information may be based at least in part on stored block change information indicating monitored changes to blocks in the volume. The block restore information may be provided to a backup storage node. The block restore information is used to retrieve backup data associated with the identified blocks. The backup data may be used to restore the volume to a state at the backup time by replacing the identified blocks with corresponding backup data.

18 Claims, 10 Drawing Sheets

(56) References Cited

U.S. PATENT DOCUMENTS

2015/0370645 A1* 12/2015 Dhanalakoti ....... G06F 11/1451
707/646
2016/0077926 A1 3/2016 Mutalik

* cited by examiner

| Event No. | Timestamp | Save Set | Block(s) Changed | Remarks | Change Relative to Last Backup |
|---|---|---|---|---|---|
| 1 | 09:00 | F:\ | N/A | Full Backup | |
| 2 | 10:00 | F:\ | XXX – XXX1 YYY – YYYY1 ZZZZ – ZZZZ1 | | 10% |
| 3 | 11:00 | F:\ | AAA-BBBB | | 20% |
| 4 | 12:00 | F:\ | CCC-DDD | | 30% |
| 5 | 13:00 | F:\ | EEE | | 80% |
| 6 | 14:00 | F:\ | N/A | Incremental Backup | |
| 7 | 15:00 | F:\ | XXX – XXX1 YYY – YYYY1 ZZZZ – ZZZZ1 | | 90% |
| 8 | 16:00 | F:\ | N/A | Incremental Backup | |
| 9 | 17:00 | F:\ | 111-222 333-444 445-5555 | | 10% |
| 10 | 18:00 | F:\ | 666-6666 | | 30% |
| 11 | 19:00 | F:\ | N/A | Incremental Backup | 50% |
| 12 | 20:00 | F:\ | | | |
| 13 | 21:00 | F:\ | 22222-22223 | | 22% |
| 14 | 22:00 | F:\ | 222222-222223 | | 33% |
| 15 | 23:00 | F:\ | 11111-22222 44444-55555 | | 66% |
| 16 | 24:00 | F:\ | N/A | Full Backup | |

DIFFERENTIAL RESTORE USING BLOCK-BASED BACKUPS

BACKGROUND OF THE INVENTION

In block-based backup approaches, data is backed up by copying blocks from a source volume to a backup volume (e.g., at a backup target). Rather than backing up the entire volume at each backup, data may be incrementally copied to a backup volume. Block-based incremental backups, for example, reduce the backup window by monitoring (e.g., tracking) changes to blocks in a source volume and only backing up blocks that have changed since a previous backup. Block-based incremental backup approaches have been improved incorporating such techniques as virtual synthetic full backup, inline incremental backup, and other approaches.

BRIEF DESCRIPTION OF THE DRAWINGS

Various embodiments of the invention are disclosed in the following detailed description and the accompanying drawings.

DETAILED DESCRIPTION

Figure 1:
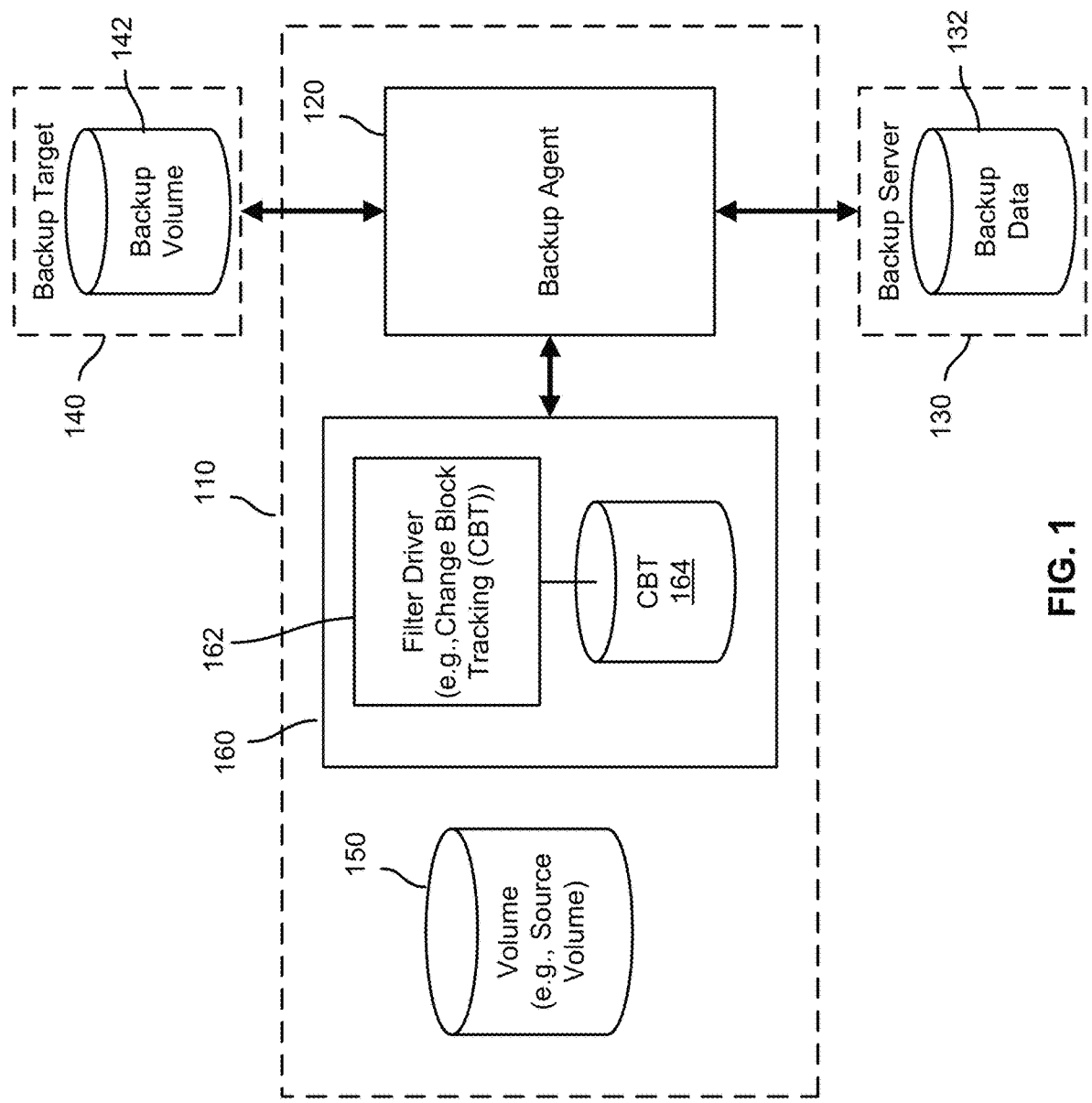
FIG. 1 is a block diagram illustrating an embodiment of a system to perform differential restores using block-based backups.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In various embodiments, the data restore approaches disclosed herein optimize, increase the speed of, and/or otherwise improve data restoration to a storage volume. Rather than restoring an entire volume, the differential restore techniques disclosed herein in various embodiments may replace only blocks on the source volume that have changed between the time of restore and a previous backup time (e.g., a restore point, a desired restore time). For example, in a differential restore operation, blocks that have changed between the restore time and a target backup time may be identified, and the identified changed blocks may be removed and replaced by corresponding blocks retrieved from the backup volume. This surgical removal and replacement of changed blocks may reduce the data recovery window compared to a full restore operation, especially, when the number of changed blocks to be replaced is low.

In certain cases, however, it may be more efficient to perform a full restore operation rather than a differential restore. As such, upon initiation of a restore operation for a source volume, in some embodiments it may be determined whether a number and/or percentage of changed blocks relative to a backup time (e.g., a restore point) exceeds a threshold. In the event the number and/or percentage of changed blocks is below (e.g., does not exceed) the threshold, a differential restore process may be performed. In the event the number exceeds the threshold, a full restore may be initiated. In this scenario, due to the number of blocks to be replaced it may be more efficient to restore the entire volume, and a full restore operation may be initiated. In a full restore, at least a portion of the entire volume (e.g., the entire volume) is replaced with backup data, and block-level data replacement decisions are not made.

FIG. 1 is a block diagram illustrating an embodiment of a system to perform differential restores using block-based backups. In the example shown, a system for differential restore using block-based backups 100 may include a computing device 110 (e.g., client device), backup agent 120, backup server 130, backup target 140, source volume 150, change block tracking (CBT) engine 160, and/or other components. The computing device 110 (e.g., client device, source device) may include a desktop computer, server, mobile device, and/or any other computing device. The computing device 110 may include a processor (e.g., a central processing unit (CPU)), random access memory (RAM), and/or a volume 150 (e.g., source volume, data storage volume, disk(s)s, hard-disk drive(s) (HDD), solid-state drive(s) (SSD), a portion of a drive (e.g., F:\), partition(s), virtual disk(s), etc.).

According to various embodiments, a change block tracking (CBT) engine 160 may include a CBT driver 162 (e.g., file system filter driver, a change block tracking (CBT)

driver, etc.), CBT database 164, and/or other components. The CBT driver 162 may, for example, include a file system filter driver configured with change block tracking capabilities (e.g., configured to execute CBT algorithms). The CBT driver 162 may track and/or monitor changes to the volume 150 (e.g., changed blocks in the volume 150). The CBT driver 162 may, for example, monitor and/or track changes to blocks in the volume 150 continuously (e.g., in real time), at intervals (e.g., every 10 seconds, five (5) minutes, etc.), and/or in any other manner. The CBT driver 162 may store monitored and/or tracked changes to the volume 150 as block change information in a CBT database 164. The block change information may, for example, be stored as a bitmap, in a table, data arrangement, data schema, and/or other data structure in the CBT database 164. For example, the block change information data structure may include tracked block change information collected over a period of time (e.g., since a last backup, over a user-defined period, since installation, etc.). In some embodiments, the block change information data structure may be reset (e.g., cleared, erased, archived) upon the occurrence of certain events including, for example, backup operations, data restore operations, and/or other data protection operations executed on the volume 150.

In various embodiments (not shown), the CBT engine 160 and/or components thereof may be located on a switch and/or other node. For example, the system 100 may include an intelligent switch (e.g., between a client device 110 and backup target 160), and the intelligent switch may include block change tracking functionality.

In various embodiments, the backup agent 120 (e.g., backup client) is included on (e.g., software installed on) the computing device 110. The backup agent 120 may communicate with the CBT engine 160, backup server 130, backup target 140, and/or other components to facilitate and/or manage the execution of backup and/or restore operations. In some embodiments, the backup agent 120 may retrieve (e.g., pull) block change information from the CBT engine 160. For example, upon initiation of a data restore operation to restore the volume 150 to a state at a backup time (e.g., a restore point), the backup agent 120 may query the CBT database 164 to retrieve block change information identifying blocks that have changed since the backup time. In some embodiments, the block change information may be provided (e.g., pushed) to the backup agent 120 from the CBT engine 160. For example, the CBT engine 160 may periodically and/or continuously provide block change information to the backup agent 120. In another example, the CBT engine 160 may provide block change information to the backup agent 120 based on the occurrence of a triggering event (e.g., a percentage and/or number of changes to the volume).

According to various embodiments, the backup agent 120 may communicate with a backup server 130 to perform backup, restore, and/or other data protection operations. The backup server 130 may be associated with a backup data repository 132. The backup data repository 132 may include backup records (e.g., block map(s), block offset information, etc.), configuration information, backup schedule information (e.g., scheduled full backups, incremental backups), and/or other backup-related information.

In some embodiments, the backup server 130 may coordinate backup operations in conjunction with the backup agent 120. The backup agent 120 may facilitate copy and/or transfer of data (e.g., blocks) from the source volume 150 to a backup target 140. During a backup operation, data blocks may be transferred and/or copied from the volume 150 (e.g., the source volume) to the backup target 140 for storage in a backup volume 142 (e.g., replica volume, virtual hard disk (VHD), tape, etc.). The backup volume 142 includes a set of backups of the source volume 150. The backup volume 142 may, for example, include backup datasets including full backup(s) and/or incremental backups. In conjunction with a backup operation, information regarding the data (e.g., blocks) transferred and/or copied from the source volume 150 to the backup volume 142 may be stored at the backup server 130 in a backup data repository 132 (e.g., backup data database). For example, the backup data repository 132 may include a map of blocks included in each of one or more backup(s) (e.g., a full backup and/or incremental backups). The backup data repository 132 may store records including offsets (e.g., block offsets) and locations of backup data on the backup volume 142. In some embodiments, as part of a backup operation, a mapping of the offsets for blocks on the source volume 150 and corresponding blocks on the backup volume 142 may be generated. A mapping of blocks stored on the source volume 150 to corresponding blocks (e.g., backup blocks, replica blocks) on the backup volume 142 may be stored in the backup data repository 132. This mapping of blocks in the source volume 150 to blocks in the backup volume 142 may also be stored and/or replicated at the computing device (e.g., the client). For example, the block change information stored in the CBT database 164 may include offset information associated with data stored on the source volume 150 and/or corresponding block locations on the backup volume 142. The mapping of blocks on the source volume 150 to corresponding blocks on the backup volume 142 may be used to perform a differential restore.

In various embodiments, the backup agent 120 may communicate with the backup server 130 to perform a restore operation. A restore operation may be initiated to restore the source volume 150 to a state at the time (e.g., restore point, restore time) of a previous backup (e.g., a full backup, incremental backup, etc.). The backup time (e.g., restore point) may be specified by user input, determined based on events on the computing device 110 (e.g., data corruption, data loss, etc.), and/or otherwise generated. A restore operation may be initiated (e.g., triggered) by user input (e.g., a user associated with a computing device 110, backup server 130, etc.), by backup server 130, backup agent 140, and/or any other node.

According to some embodiments, upon initiation of a restore operation, it may be determined whether to perform a differential restore and/or a full restore to the state of the source volume 150 at the backup or other time to which the volume 150 is to be restored. In a full restore operation, backup data for all blocks of the source volume 150 may be retrieved from the backup target 140, and the source volume 150 may be restored to a state at the backup time by replacing the contents of the source volume 150 with the backup data received from the backup target 140.

In a differential restore operation, the backup agent 120, CBT engine 160, and/or backup server 130 may determine and/or generate block restore information identifying blocks in the source volume 150 that have changed since the backup or other time (e.g., restore point) to which the data is to be restored. The block restore information may be generated and/or determined based on, for example, block change information indicating monitored and/or tracked changes (e.g., as monitored by the filter driver 162) to the data blocks in the source volume 150. The block restore information indicating blocks that have changed since the backup time may be provided to a data storage node (e.g., the backup target 140, backup server 130). The block restore information may be used at the backup storage node to retrieve backup data corresponding the blocks identified in the block restore information. The backup data may, for example, include backup blocks (e.g., replica blocks) corresponding to the blocks identified in the block restore information. The backup blocks may include the blocks copied to (e.g., backed up to) the backup target 140 at the backup time. The backup data may be provided from the backup target 140 to the computing device 110 (e.g., the backup agent 120) to restore the source volume 150. In various embodiments, the backup data may be used (e.g., by the backup agent) to restore the source volume 150 to the state (e.g., previous state) at the backup time by replacing the blocks on the source volume 150 that have changed since the backup time with corresponding blocks included in the backup data.

Figure 2:
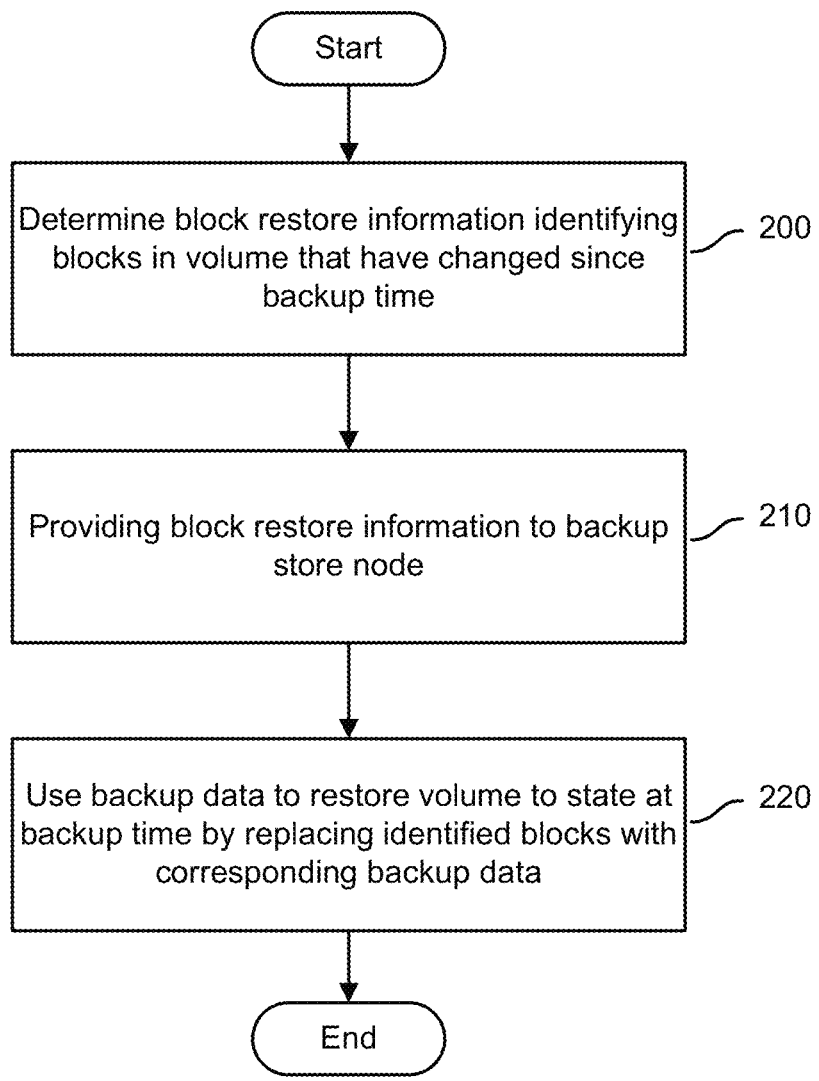
FIG. 2 is a flow chart illustrating an embodiment of a process of differential restore using block-based backups.

FIG. 2 is a flow chart illustrating an embodiment of a process of differential restore using block-based backups. At 200, block restore information identifying blocks in a volume that have changed since a backup time may be determined. The block restore information may be determined based on stored block change information indicating monitored changes to blocks in the volume. For example, a CBT engine and/or other component(s) may monitor and store block change information including changes to blocks in a source volume on the computing device.

In various embodiments, upon initiation of a restore operation, a backup time (e.g., desired backup time, restore point) may be received and/or determined. The backup time may be used to identify blocks in the source volume to be restored (e.g., replaced with corresponding blocks from a backup volume). For example, the block change information may be queried and/or analyzed to identify blocks in the source volume that have changed over the period starting at the backup time (e.g., restore point) and ending at the restore time. The block restore information may be generated including the identified changed blocks. The block restore information may include identifiers (e.g., block locations, block offsets, block locations, etc.) associated with the changed blocks in the source volume.

At 210, block restore information is provided to a backup storage node. In various embodiments, the block restore information provided to a backup storage node including, for example, a backup server (e.g., backup server 130 of FIG. 1), backup target 140 (e.g., a backup target including management functionality), and/or other backup storage node. In some embodiments, the block restore information identifying blocks that have changed relative to the backup time may be used at the backup server to determine backup data (e.g., blocks) to be retrieved from the backup target (e.g., backup volume). In some embodiments, the blocks identified in the block restore information may be mapped to corresponding blocks in backup dataset(s) (e.g., a backup taken at the backup time (restore point)) stored in a backup volume.

In some embodiments, the backup server may provide (e.g., to the backup agent, the backup target, and/or another node) the block location and/or offset information for blocks in the backup volume that correspond to the blocks identified in the block restore information. This information may be used to retrieve backup data associated with the blocks identified in the block restore information. And the retrieved backup data may be provided to the source volume (e.g., via the backup agent).

At 220, the backup data is used to restore the volume to a state at the backup time by replacing the identified blocks with corresponding backup data. In various embodiments, the backup data may include blocks from a backup dataset associated with the backup time (e.g., the restore point). In some embodiments, backup data may include blocks that correspond to changed blocks identified in the block restore information. The corresponding blocks included in the backup data may be used to replace the blocks on the source volume that have changed since the backup time associated with backup data. The changed blocks may be replaced (e.g., surgically replaced) with corresponding blocks in the retrieved backup data while other blocks, which have not changed since the backup time, remain unchanged. In some embodiments, the replacement process may include concatenation and/or stitching operations to combine the replacement blocks (e.g., from the backup data) with adjacent and/or surrounding data blocks (e.g., other replacement blocks, blocks on the source volume prior to restoration, etc.). Other operations may also be performed to ensure proper functionality of the source volume after restoration.

Figure 3:
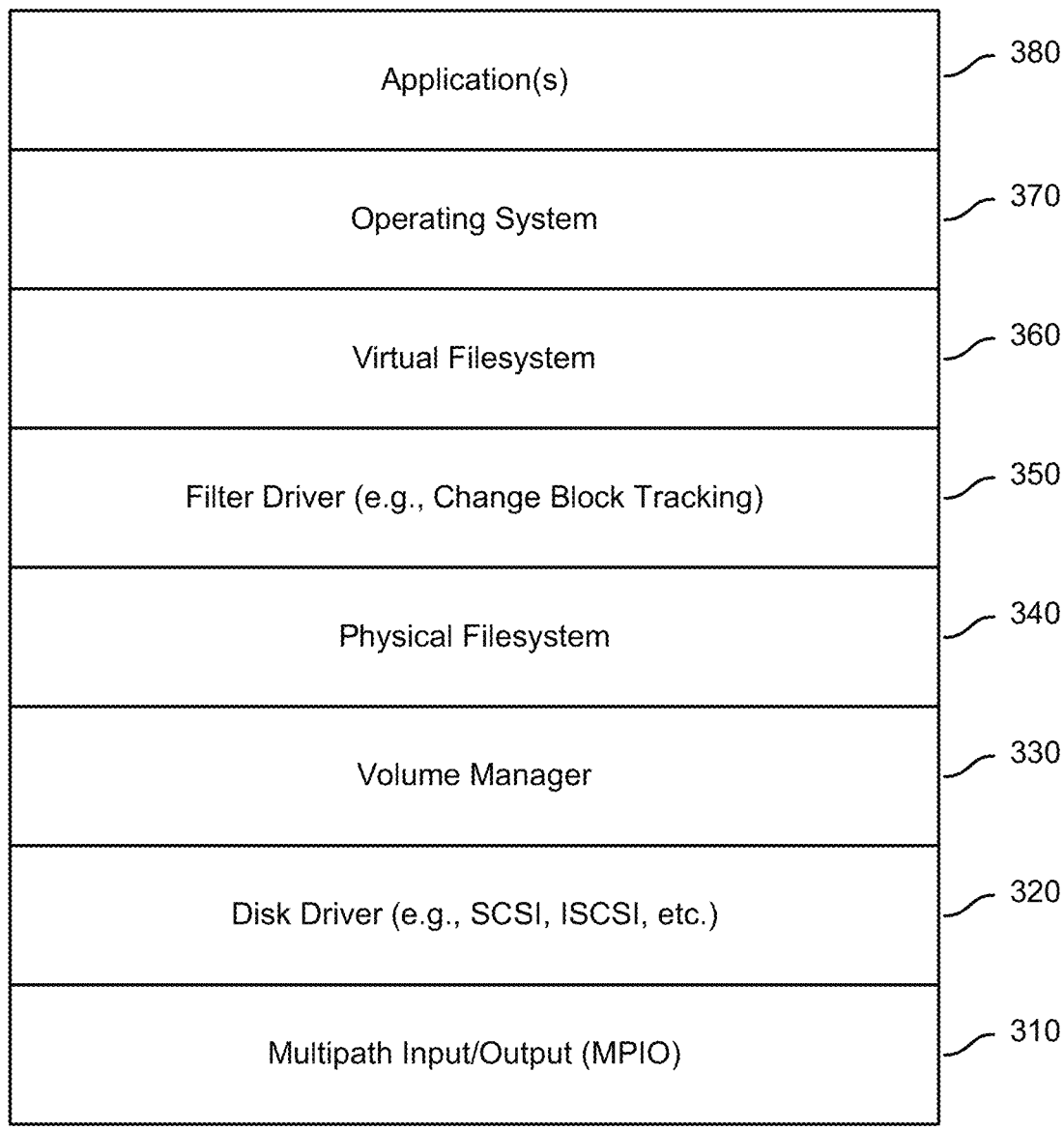
FIG. 3 is a block diagram illustrating an embodiment of an operating system including change block tracking functionality.

FIG. 3 is a block diagram illustrating an embodiment of an operating system including change block tracking functionality. In the example shown, an operating system (OS) stack 300 is depicted. The OS stack 300 may include, for example, a multipath input/output (MPIO) layer 310, disk driver(s) 320 (e.g., Small Computer System Interface (SCSI), Internet Small Computer System Interface (ISCSI), etc.), a volume manager 330, physical file system 340, filter driver 350 (e.g., file system filter driver, change block tracking driver), virtual file system 360, operating system 370, and/or an application layer 380. In various embodiments, the file system filter driver 350 may include functionality (e.g., algorithms) which enable it to intercept and/or track writes to data on a physical file system 340 (e.g., source volume) with change block tracking. The monitored/tracked writes to data may be stored as block change information in, for example, a change block tracking repository (e.g., CBT repository 164 of FIG. 1) associated with the filter driver 350. In some embodiments (not shown), the filter driver 350 may be situated between a physical file system 340 and a disk driver 320.

Figure 4:
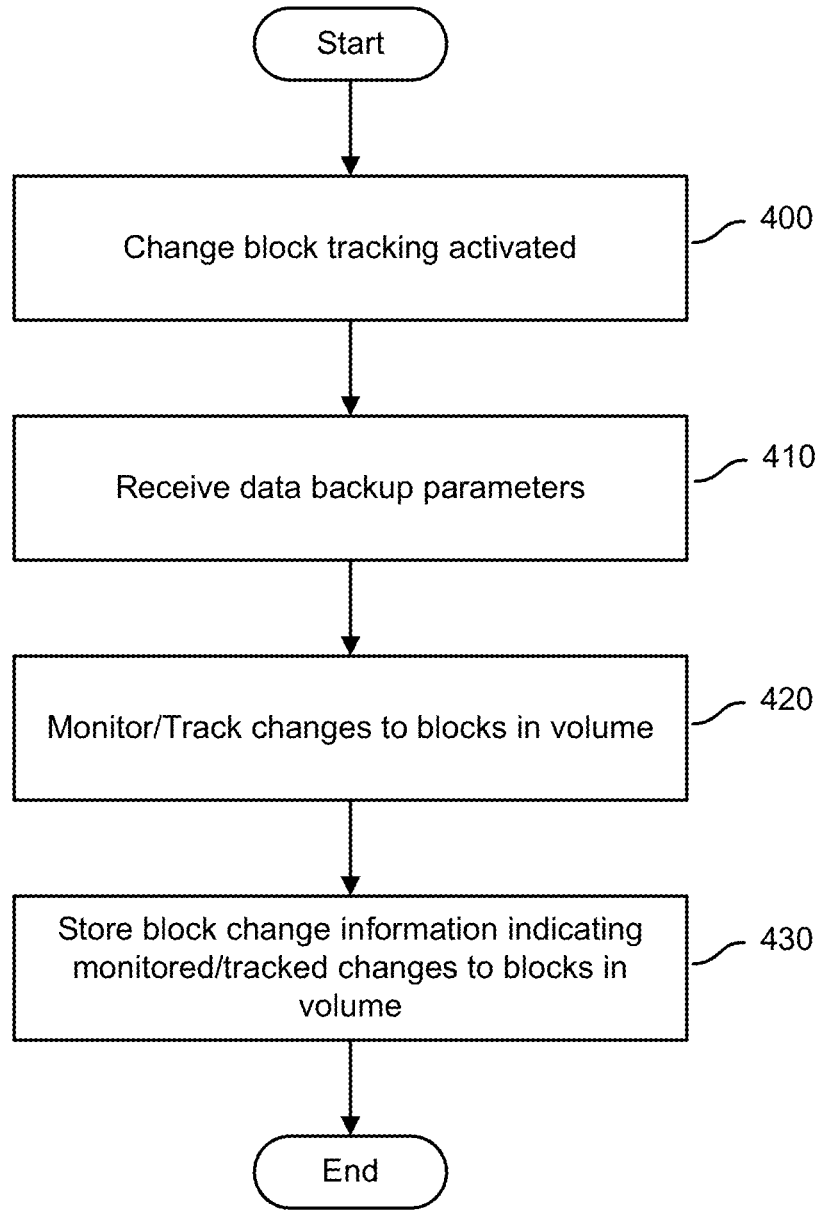
FIG. 4 is a flow chart illustrating an embodiment of a process of change block tracking.

FIG. 4 is a flow chart illustrating an embodiment of a process of change block tracking. At 400, change block tracking/monitoring may be activated. In some embodiments, change block tracking of a source volume may be activated when a first backup of the volume is executed. Change block tracking and/or monitoring may be activated by initiating change block tracking (CBT) feature of a filter driver as discussed herein.

At 410, data backup parameters are received and/or determined. Data backup parameters may include backup configuration information including, for example, types of backup (e.g., incremental, full, etc.) to be performed, source volume information (e.g., drive location on computing device, storage capacity, etc.), backup targets and/or backup volumes to which data from a source volume is to be copied, and/or any other backup configuration information. Data backup parameters may include backup schedule information including, for example, times at which backups are to be performed, periodic backup schedule information, and/or other information associated with scheduling backups. In some embodiments, data backup parameters may be received from an end user (e.g., a user associated with the source volume), an administrator associated with the backup server, and/or any other source.

At 420, changes to blocks stored in the volume may be tracked and/or monitored. In some embodiments, changes to blocks in a source volume may be tracked using a change block tracking driver (e.g., a filter driver) and/or other components associated with a source volume.

At 430, block change information indicating monitored and/or tracked changed to blocks in the volume may be stored. In some embodiments, block change information may be stored in a database associated with the change block tracking filter driver (e.g., a CBT database). For example, a block change information data structure may be generated and/or updated to indicate changes to blocks in the source volume over time. An example block change information data structure (e.g., table) is illustrated in FIG. 5.

Figure 5:
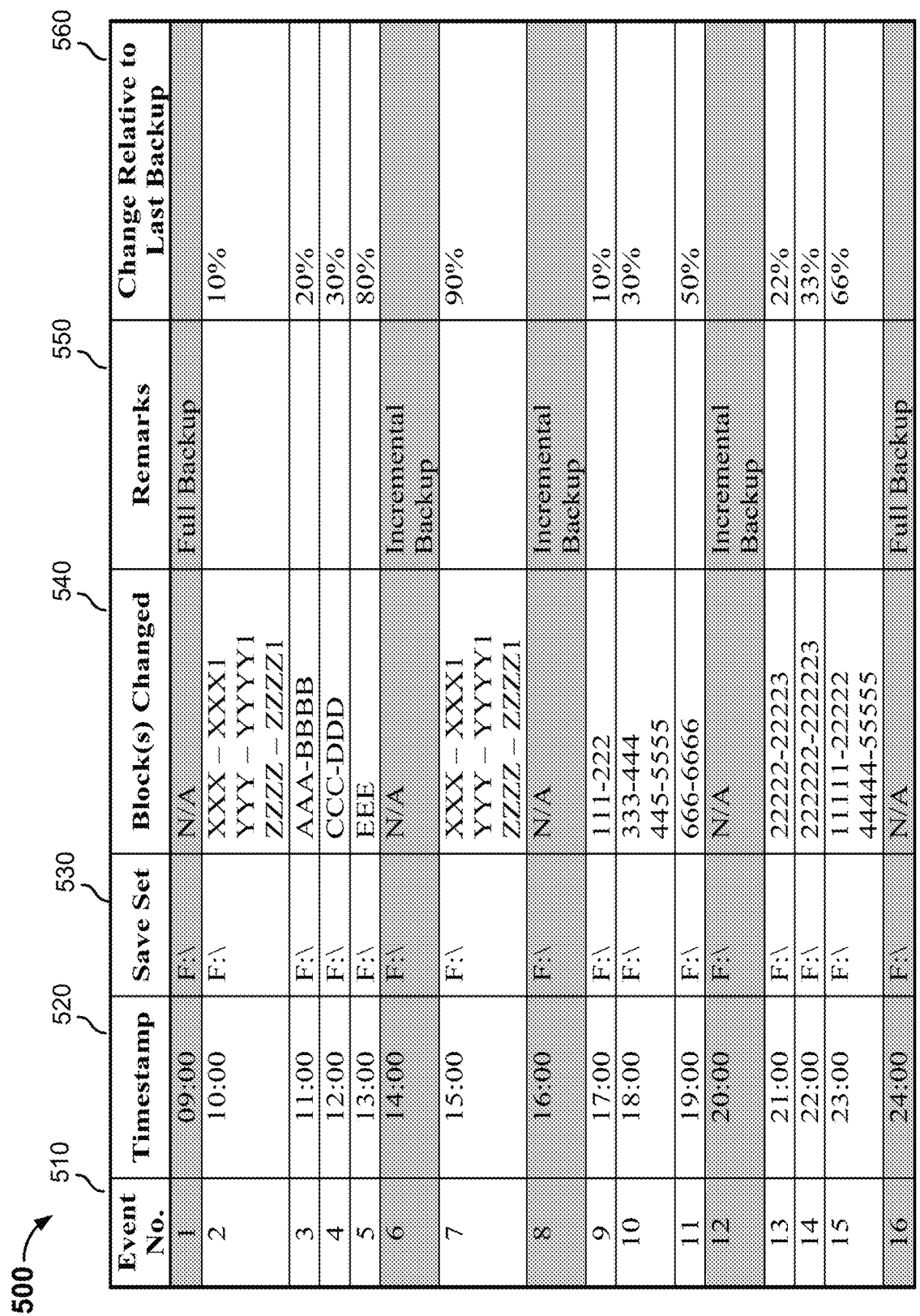
FIG. 5 is a diagram illustrating an embodiment of a block change information data structure.

FIG. 5 is a diagram illustrating an embodiment of a block change information data structure. In the example shown, block change information data structure 500 (e.g., table) may include information indicating changes to blocks in a storage volume. The block change information data structure 500 may, for example, be generated by a CBT engine (e.g., CBT engine 160 of FIG. 1), and the block change information 500 may be stored in a CBT database (e.g., CBT database of 164 of FIG. 1). The block change information data structure 500 may include one or more events 510 (e.g., times of block change information measurement, backup, restore, storage, etc.) associated with a volume. An event 510 may be associated with a timestamp 520 (e.g., time), a save set 530 (e.g., identifier associated with a volume, a partition and/or portion of a volume, etc.), block(s) changed 540 (e.g., block(s) changed at the time of the event relative to the last event), remarks/details 550 related to the event (e.g., "full backup," "incremental backup," "data corruption event occurred"), a number/percentage of blocks/volume changed 560 relative to a last backup, and/or other information. In addition to the data sets depicted, the block change information 500 may include, for example, a percentage and/or number of blocks changed relative to backups other than a most recent backup. For example, the block change information 500 may include for each timestamp a percentage and/or number of blocks changed since a most recent full backup (e.g., regardless of whether the most recent backup was a full or incremental backup).

By way of example, a first event may occur when a full backup of an F:\ drive (e.g., a source volume) is performed at 09:00. Changes to the F:\ drive may be tracked continuously (e.g., in real time). For clarity of description, the example change block information data structure 500 shown depicts changes to the F:\ drive each hour. Changes to the volume, however, may be tracked and stored continuously, at other intervals (e.g., every minute, half hour, etc.), and/or in another manner. Continuing with the example, a second event may occur at 10:00 when blocks XXX-XXX1, YYY-YYYY1, and ZZZZ-ZZZZ1 included in the F:\ drive are changed. As shown in the data structure 500, changes to these blocks may represent a 10% change to the F:\ drive relative to the last backup, which occurred at 09:00. At 11:00 the block change information data structure 500 may indicate, for example, that blocks AAA-BBBB have changed, and that 20% of the volume has changed since the full backup at 09:00. This 20% may represent a cumulative change to the volume relative to a last backup. For example, the 20% value may include the 10% change associated with the change to blocks XXX-XXX1, YYY-YYYY1, and ZZZZ-ZZZZ1 as well as a 10% change associated with the change to blocks AAA-BBBB. Similar block change information is tracked and stored each hour, continuously (not shown), and/or at other interval(s). At 14:00, a backup operation may be executed. At this point, the number/percentage of blocks changed relative to last backup 560 may be reset (e.g., set to 0).

In various embodiments, the number and/or percentage of blocks changed relative to a last backup 560 may be used to determine whether a full restore operation or differential restore operation is executed. For example, data restore parameters (e.g., received from an end user, administrator, etc.) may include a restore change threshold (e.g., a threshold change value). The threshold value may include a number and/or percentage of changed blocks relative to a last backup. The threshold may be defined such that at a restore time, if the number and/or percentage of blocks changed relative to the last backup 560 time exceeds the threshold (e.g., is equal to or exceeds), a full backup operation (e.g., restoring the entire volume as backed up at the time of previous backup) will be performed. If, however, the number and/or percentage of blocks changed relative to a last backup 560 is less than the threshold (e.g., equal to or less than), a differential backup operation may be performed. In various embodiments, a restore change threshold may be selected to optimize the block restore process. For example, if at the time of restoration only 20% of a volume has changed, it may be more efficient to retrieve backup data corresponding to the changed blocks, replace the changed blocks with backup data, and concatenate and/or stitch the backup data (e.g., blocks) to other blocks in the volume. If, however, if at the time of restoration 80% of a volume has changed relative to a desired backup time, it may be more efficient to execute a full restore operation.

By way of example with reference to block change information data structure 500, a restore-change threshold may be set to 40%. In this case, if a restore operation related to the F:\ drive is initiated at 13:05, it may be determined that the percentage of blocks changed since the previous backup at 09:00 (e.g., 80%) is greater than the threshold, and a full restore of the F:\ drive as backed up at 09:00 may be restored.

In another scenario, if a restore operation is initiated at 18:00, it may be determined that the percentage of blocks changed since the previous backup at 16:00 (e.g., 30%) is less than the threshold, and differential restore of the F:\ drive may be executed. In a differential restore operation, the block change information 500 may be queried and/or searched to identify which blocks have changed between the target backup time (e.g., the backup at 16:00) and the restore time (e.g., 18:10). In this case, the blocks changed may include blocks 111-222 (e.g., changed between 16:00 and 17:00) as well as blocks 333-444 and blocks 445-5555 (e.g., changed between 17:00 and 18:00). Block restore information may be generated identifying blocks 111-222, 333-444, and 445-5555. The block restore information may be provided to a data backup node. Backup data including blocks corresponding to blocks 111-222, 333-444, and 445-5555 that were copied to the backup target at 16:00 may be retrieved and/or received from the backup volume (e.g., backup target). And the F:\ volume may be restored by replacing the change blocks with corresponding blocks received from the backup target. By performing a differential restore, the F:\ volume may be restored to a state the time of the 16:00 backup without having to retrieve the entire 16:00 incremental backup and/or possibly portions of the 09:00 full backup. Because the changed blocks only represent a change of 30% of the F:\ volume relative to the 16:00 incremental backup, it may be more efficient (e.g., take less time) to restore only the changed blocks.

Figure 6:
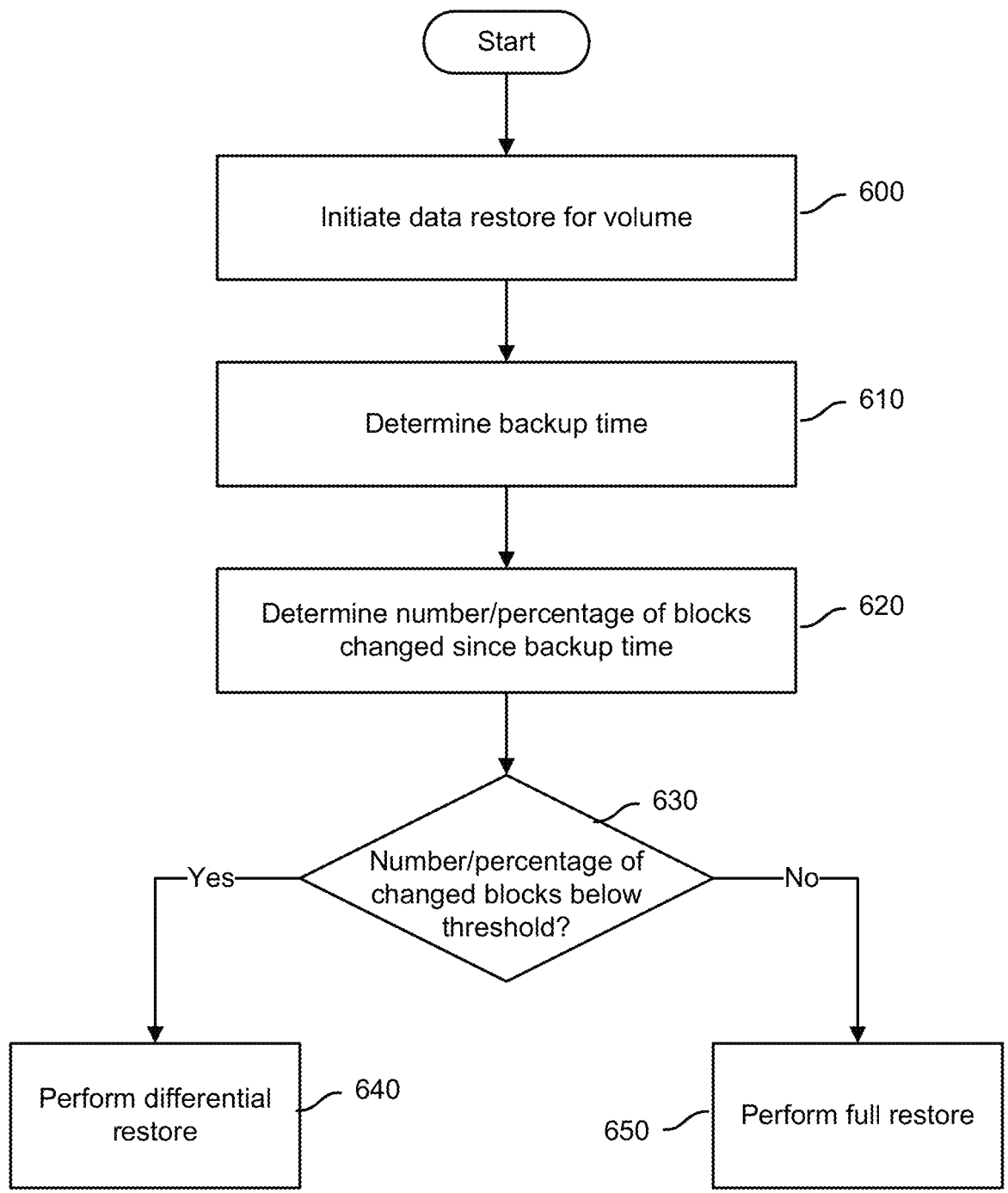
FIG. 6 is a flow chart illustrating an embodiment of a process of block-based restoration.

FIG. 6 is a flow chart illustrating an embodiment of a process of block-based restoration. At 600, a data restore operation may be initiated. In various embodiments, a restore operation may be initiated (e.g., triggered) by user input (e.g., a user associated with a computing device, backup server, etc.), by the backup server, by the backup agent, and/or any other node. In some embodiments, data restore may be automatically initiated based on (e.g., in response to) events related to the source volume including, for example, data erasure (e.g., inadvertent erasure, malicious erasure, etc.), data corruption, data theft, and/or any other event necessitating the restoration of data to a prior state.

At 610, a backup time may be determined. According to some embodiments, the backup time may include a time (e.g., timestamp) associated with a previous state and/or backup of the source volume. For example, a backup time may include a time at which a backup was initiated, completed, and/or otherwise occurred. In one example, the backup time may be associated with a most recent backup (e.g., a full backup, incremental backup) of the source volume. In another example, the backup time may be associated with any backup including a backup prior to a most recent backup. The backup time may be used to identify blocks in the source volume to be restored (e.g., replaced with corresponding blocks from a backup volume).

In various embodiments, the backup time may be used to identify a particular prior state of the source volume to be restored. For example, a user may select a backup time of 12:00 if they desire the volume to be restored to its state at 12:00. In one example, the backup time may be received from, for example, a user (e.g., a user that initiated the backup operation, a user of the computing device, an administrator associated with a backup server, etc.). In another example, the backup time may be determined based on events related to the source volume including, for example, data erasure, data corruption, data theft, and/or any other event necessitating the restoration of data to a prior state. For example, the backup time may be a time associated with a most recent backup (e.g., stored at the backup volume) that includes the data sought to be restored.

In some embodiments, a backup time and target backup associated therewith may be determined based on the block change information. The block change information (e.g., collected and stored by the CBT filter driver) may be queried to identify a target backup to be restored. For example, the block change information may be queried to identify a most recent backup that includes a certain set of data (e.g., data that was lost, data that has become corrupted, etc.) that is sought to be restored.

At 620, a number and/or percentage of blocks to be restored may be determined. In some embodiments, a number and/or percentage of blocks to be restored may be determined by a backup agent based on, for example, block change information from a CBT engine. For example, the backup agent may retrieve (e.g., request) from the CBT engine block change information identifying the blocks that have changed over a period from the backup time to the restore time. For example, the percentage and/or number of changed blocks relative to the backup time may be stored in a block change information data structure (e.g., table) as discussed above, and the CBT engine may retrieve the number and/or percentage of changed blocks from the block change information table and provide the number and/or percentage to the backup agent. In another example, the CBT engine may push (e.g., provide) block change information to the backup agent periodically, upon the occurrence of events (e.g., significant changes to the blocks in the volume, backup events, etc.).

At 630, it may be determined whether the number and/or percentage of changed blocks is below (e.g., less than) a threshold value. In some embodiments, the threshold value may be defined based on data received from end user (e.g., a user associated with a computing device including the source volume), and/or an administrator (e.g., associated with a backup server). In various embodiments, the threshold value may be determined with the goal of minimizing a restore window while not incurring excessive processing overhead. For example, the differential restore process may include the steps of, for example, determining changed blocks, generating block restore information, providing the block restore information to a backup server, retrieving backup data from the data target, and concatenating and/or stitching the backup data into the source volume. These and other operations performed during the differential restore process, in various embodiments, may introduce processing and/or computational overhead. In the case of restoring, for example, 20% of a volume, this processing and/or computational overhead may be outweighed by efficiency and/or reduced restore window resulting from differential block restoration. If, however, at the time of restoration only 80% of a volume has changed relative to a desired backup time, it may be more efficient to execute a full restore operation.

In some embodiments, a threshold value may be determined based on prior restore operations. For example, previous differential and/or full operations performed on the source volume and/or other source volumes may be analyzed to determine an optimum threshold number and/or percentage of changed blocks. The threshold may be determined based at least in part on empirical restore operation data.

In various embodiments, the backup agent may determine whether the number and/or percentage of blocks is above, equal to, or below the threshold. For example, the backup agent may compare the number and/or percentage received from the CBT engine to a threshold value to determine whether differential restore operation or a full restore operation should be performed. In some embodiments, this threshold comparison may occur at a backup server, the backup target, and/or other nodes as disclosed herein. In the event it is determined that the number and/or percentage of change blocks is below (e.g., equal to or below) a threshold, the process may proceed to step 640. In the event it is determined that the number and/or percentage of change blocks is above (e.g., equal to or above) a threshold, the process may proceed to step 650.

At 640, a differential restore operation is performed. In a differential restore operation, the blocks on a source volume that have changed since a backup time may be replaced by backup data including corresponding blocks retrieved and/or received from a backup volume (e.g., a backup target).

At 650, a full restore operation is performed. In various embodiments, a full restore operation may include retrieving and/or receiving the full image of the source volume at the backup time from the backup target. For example, block restore information identifying the entire source volume (e.g., all blocks therein) may be provided to the data storage node (e.g., backup server, backup target, etc.). Backup data including the entire volume as backed up at the backup time may be received (e.g., from the backup target), and the backup data may replace the data stored on the volume at the time the restore was initiated.

Figure 7:
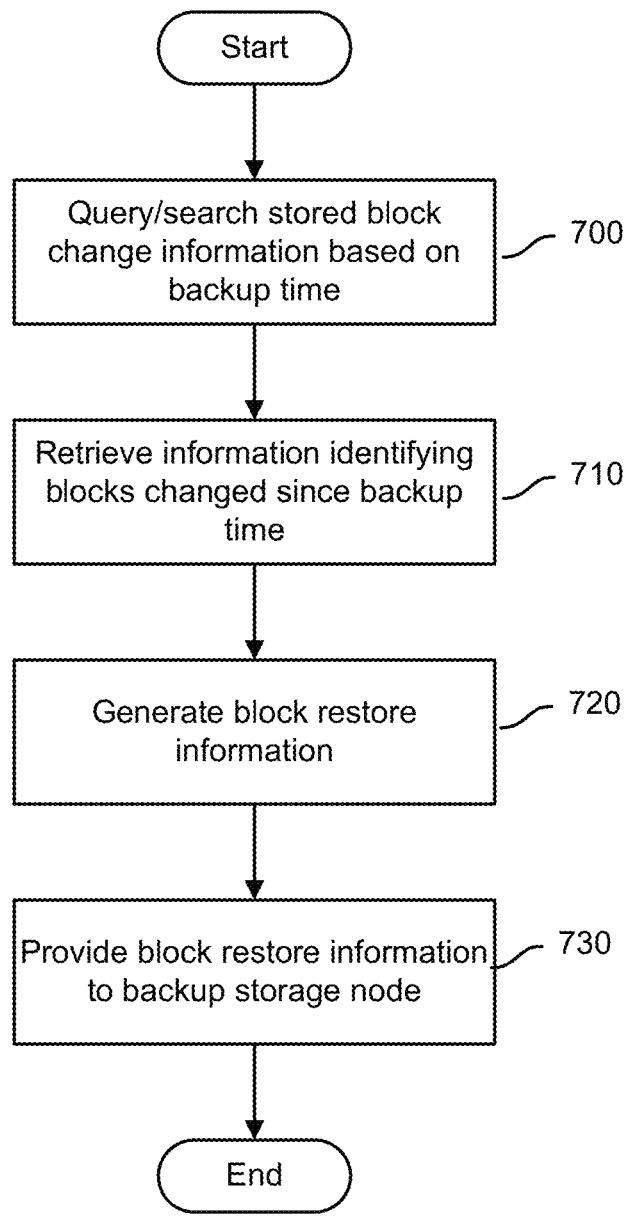
FIG. 7 is flow chart illustrating a process of differential restore using block based backups.

FIG. 7 is flow chart illustrating a process of differential restore using block based backups. In some embodiments, the process of FIG. 7 is executed by backup agent 120 and/or CBT engine 160 of FIG. 1. At 700, block change information may be queried and/or searched based at least in part on the backup time. A backup time may be used to identify a particular prior state of the source volume to be restored. As discussed above, the backup time may include a time and/or state to which the source volume is to be restored. In various embodiments, a block change information data structure and/or database may be queried based on the backup time and a restore time (e.g., a current time, the time at restore initiation) to identify blocks on the source volume that have changed between the restore time and the backup time.

At 710, information identifying blocks changed since backup time may be retrieved. In some embodiments, a backup agent may retrieve the information identifying changed blocks from the CBT engine and/or the CBT engine may provide (e.g., push) the information to the backup agent.

At 720, block restore information may be generated. In various embodiments, block restore information may be generated based at least in part on information identifying the blocks changed between the restore time and the backup time. The block restore information may, for example, identify the changed blocks by block identifier(s), block offset(s), local unit number(s) (LUN), and/or other identifying information. In some embodiments, the block restore information may, for example, identify the changed block relative to their location on the source volume, and additional processing may occur at the backup server and/or backup target to map the changed blocks on the source volume to their corresponding blocks on the backup volume.

In various embodiments, the backup agent, CBT engine and/or other node may include a map of blocks stored on the source volume to their corresponding blocks included in backup set(s) on the backup volume. This mapping may be used, for example, to map the changed blocks at the source volume to the corresponding blocks in the target backup (e.g., identified by the backup time) stored at the backup volume. In this case, the block restore information may identify the blocks as stored in backup sets at the backup volume, and this information may be used to retrieve the backup data with minimal processing at the backup volume. In various embodiments, the mapping of blocks on the source volume to corresponding blocks in backup sets stored at the backup volume may be stored at the backup agent, the backup server, and/or other nodes.

At 730, block restore information may be provided to a backup storage node. In various embodiments, the block restore information may be provided from a backup agent to a backup server. For example, the block restore information may be pushed to the backup server and/or the block restore information may be pulled from backup agent by the backup server. In some embodiments, the block restore information may be provided from a backup agent to a backup target (e.g., including a backup volume).

Figure 8:
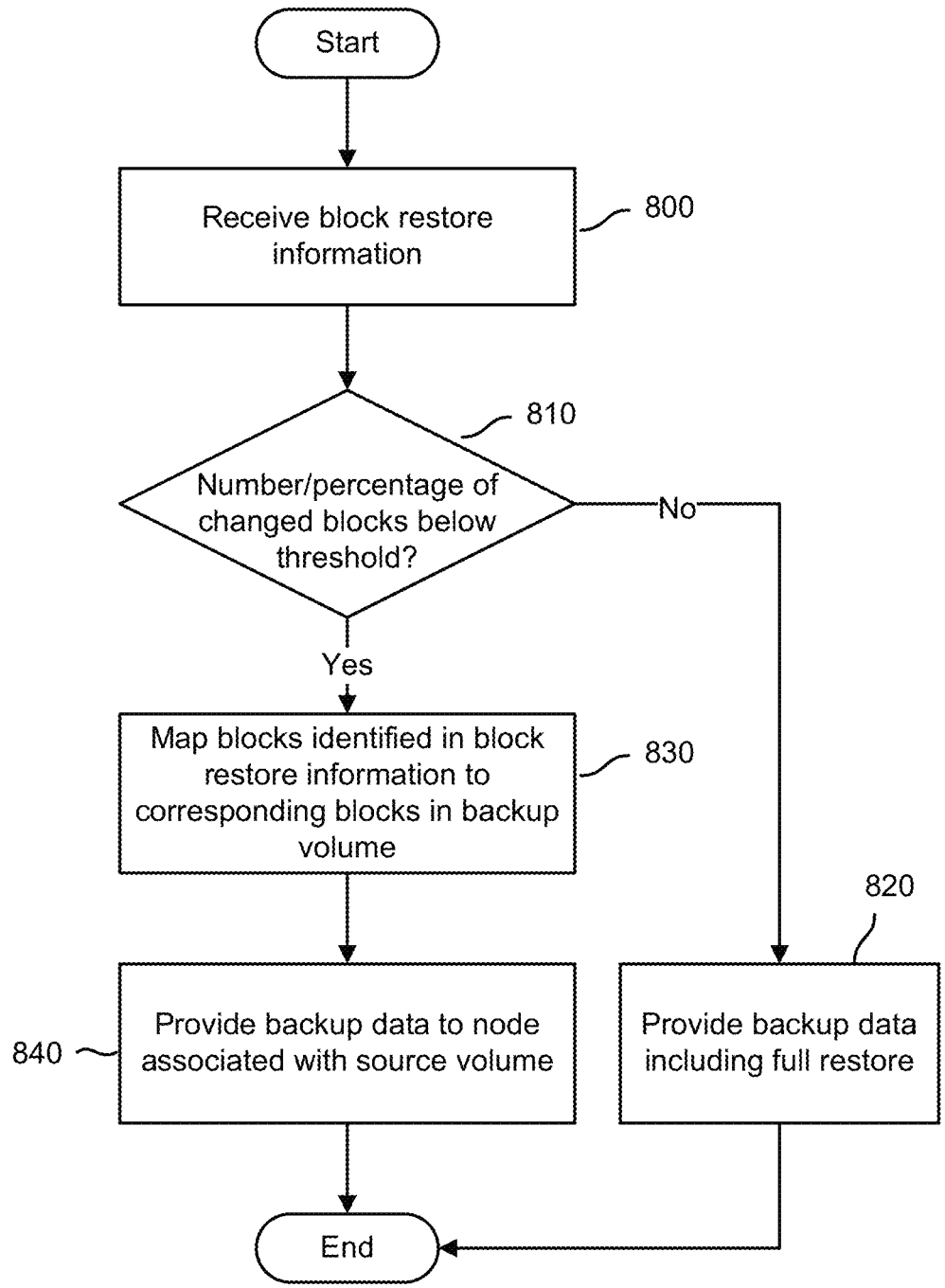
FIG. 8 is a flow chart illustrating an embodiment of a process to provide backup data to a source volume.

FIG. 8 is a flow chart illustrating an embodiment of a process to provide backup data to a source volume. In various embodiments, the process of FIG. 8 is executed by backup server 130 of FIG. 1. At 800, block restore information may be received. Block restore information may be received at, for example, a backup server (e.g., backup server 130 of FIG. 1), a backup target (e.g., backup target 140 of FIG. 1) including backup volume(s) (e.g., backup volume 142 of FIG. 1), and/or another backup storage node. In various embodiments, the block restore information may include information identifying blocks in a source volume that have changed since a backup time, a backup time associated with a target backup, and/or other block-restore related information.

At 810, it may be determined whether a number and/or percentage of changed blocks identified in the block restore information is below a threshold. In various embodiments, this step may be optional as the threshold-based determination may be executed at a backup agent, CBT engine, and/or other node as discussed herein.

In various embodiments, a number and/or percentage of blocks changed between a backup time and the restore time may be compared to a threshold. For example, the block restore information may include a number and/or percentage of changed blocks and this number may be compared to the threshold. In another example, the block restore information may identify the changed blocks relative to the backup time and the identifiers of the change blocks may be compared to the backup set associated with the backup time to determine a number and/or percentage of change blocks. And this determined number and/or percentage may be compared to the threshold. In the event the number and/or percentage of changed blocks exceeds the threshold, the process may proceed to step 820. In the event the number and/or percentage of changed blocks is below the threshold, the process may proceed to step 830.

At 820, backup data including a full restore may be provided. In various embodiments, backup data including the entire image of the source volume at the backup time may be retrieved from the backup volume and provided to the source volume (e.g., via the backup agent). The backup data may include, for example, data blocks copied to the source volume in an incremental backup taken at the backup time as well as blocks copied in other previous incremental backups and/or full backups to the backup volume. The backup data may include a synthetic full backup dataset corresponding to the desired restore point. The backup date may be provided to the backup agent and/or other node associated with the source volume.

At 830, blocks identified in the block restore information may be mapped to corresponding blocks stored in the backup volume. In some embodiments, the block restore information may identify the change blocks on the source volume relative to the backup time, and the identified changed blocks may be mapped to corresponding blocks on the backup volume.

In various embodiments, the backup server may, for example, maintain records of backups (e.g., a set of backups) that have been performed. The backup records may include information identifying blocks copied (e.g., backed up) from the source volume to the backup volume during each of one or more backups (e.g., in a set of backups stored at the backup volume). The backup records may include offset information and/or other information indicating how (e.g., location, arrangement, etc.) the blocks for a backup dataset are stored at the backup volume. The backup records may include, for example, a mapping of blocks stored on the source volume to corresponding blocks that have been copied to the backup volume and stored in backup datasets. The backup datasets may each include data (e.g., blocks) copied during a backup. Using this information, the backup server may determine for a given block on the source volume, location and/or offset information for a corresponding block in the target backup dataset (e.g., backup(s) associated with the backup time) stored in the backup volume. The backup server may determine location and/or offset information of corresponding blocks for each block identified in the block restore information.

In various embodiments, the corresponding blocks may be stored across multiple backup datasets at the backup volume. Because incremental backup and/or other backup approaches do not copy all data (e.g., blocks) from a source to backup volume during each backup, the blocks stored at the backup volume that correspond to the blocks that were present on source volume at the backup time may be stored across multiple backup datasets. For example, the corresponding blocks may be stored across multiple incremental backup datasets and/or full backup datasets. In various embodiments, the backup server may maintain location and/or offset information to identify/locate the corresponding blocks on the backup volume across multiple backup datasets.

At 840, backup data is provided to a node associated with the source volume. In various embodiments, the backup data associated with the blocks identified in the block restore information may be provided to the source volume, a backup agent associated with a source volume, and/or other node associated with the source volume.

In some embodiments, backup data may be retrieved from the backup volume by the backup server (e.g., based on a command from the backup server to the backup target). For example, the backup server may be associated with the backup target, and the backup server may provide the location and/or offset information to the backup target along with a command to provide the backup data to the backup agent and/or other node associated with the source volume. The location and/or offset information may be used (e.g., by the backup target and/or backup server) to retrieve the backup data. The backup data corresponding to the blocks identified in the block restore information may then be provided to the source volume.

In various embodiments, the backup server may provide the location and/or offset information for the corresponding blocks to the backup agent and the backup agent may provide this information along with a request for backup data to the backup target. And the backup target may retrieve the backup data corresponding to the blocks identified in the block restore information provided the backup data to the backup agent for distribution to the source volume.

Figure 9:
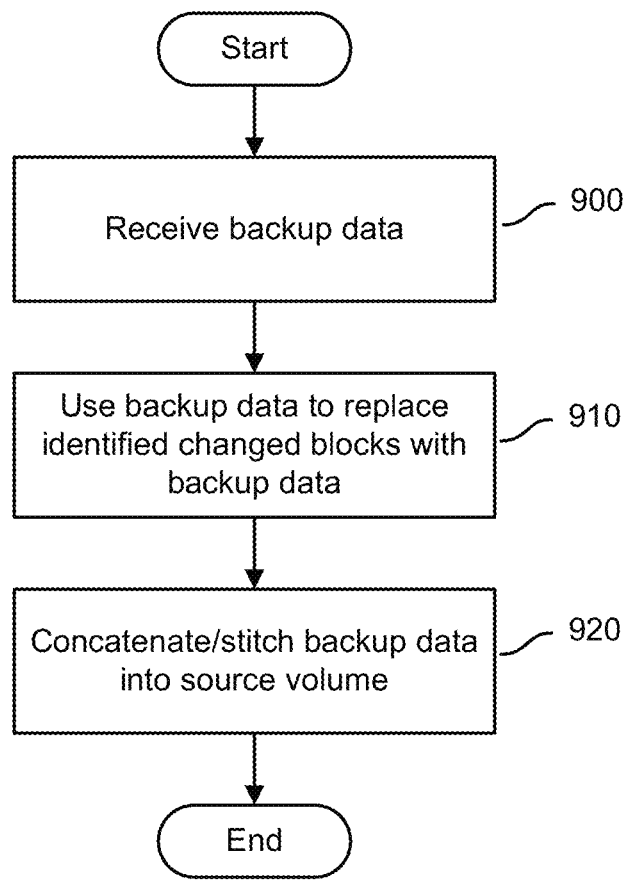
FIG. 9 is a flow chart illustrating an embodiment of a process to restore data on a volume.

According to some embodiments, the block restore information may identify changed blocks on the source volume relative to the backup time and/or may include information indicating the changes (e.g., delta) to each of one or more of the changed blocks. The information indicating the changes (e.g., delta) at the block level may be used at the backup server and/or backup target to retrieve only the portions of the changed blocks that have changed relative to the backup time. In this case, the backup data may include portions of changed blocks and/or full blocks, which may be used to restore the source volume to its state at the backup time. The portion portions of changed blocks and/or full blocks may be provided to the source volume FIG. 9 is a flow chart illustrating an embodiment of a process to restore data on a volume. In some embodiments, the process of FIG. 9 is executed by backup agent 120 of FIG. 1. At 900, backup data may be received. In various embodiments, backup data may be received at, for example, a backup agent and/or other node associated with a source volume. The backup data may, for example, be provided by a backup target.

At 910, the backup data may be used to replace the identified changed blocks with backup data. In various embodiments, the backup data received from the backup volume may include blocks corresponding to the changed blocks identified in the block restore information (e.g., provided to the backup server, backup target, etc.). The corresponding blocks may include copies of the blocks that existed on the source volume at the backup time (e.g., restore point). The blocks on the source volume that have changed relative to the backup time may be replaced by the corresponding blocks included in the backup data to, for example, restore the source volume to its state at the backup time.

At 920, the backup data is concatenated and/or stitched into the source volume. In various embodiments, concatenation operations may be performed to join the replacement blocks into surrounding blocks on the source volume. The replacement blocks may, for example, be concatenated and/or stitched to blocks on the source volume that were not replaced as part of the differential restore operation. The replacement blocks may also be concatenated and/or stitched to other replacement blocks included in the backup data.

Figure 10:
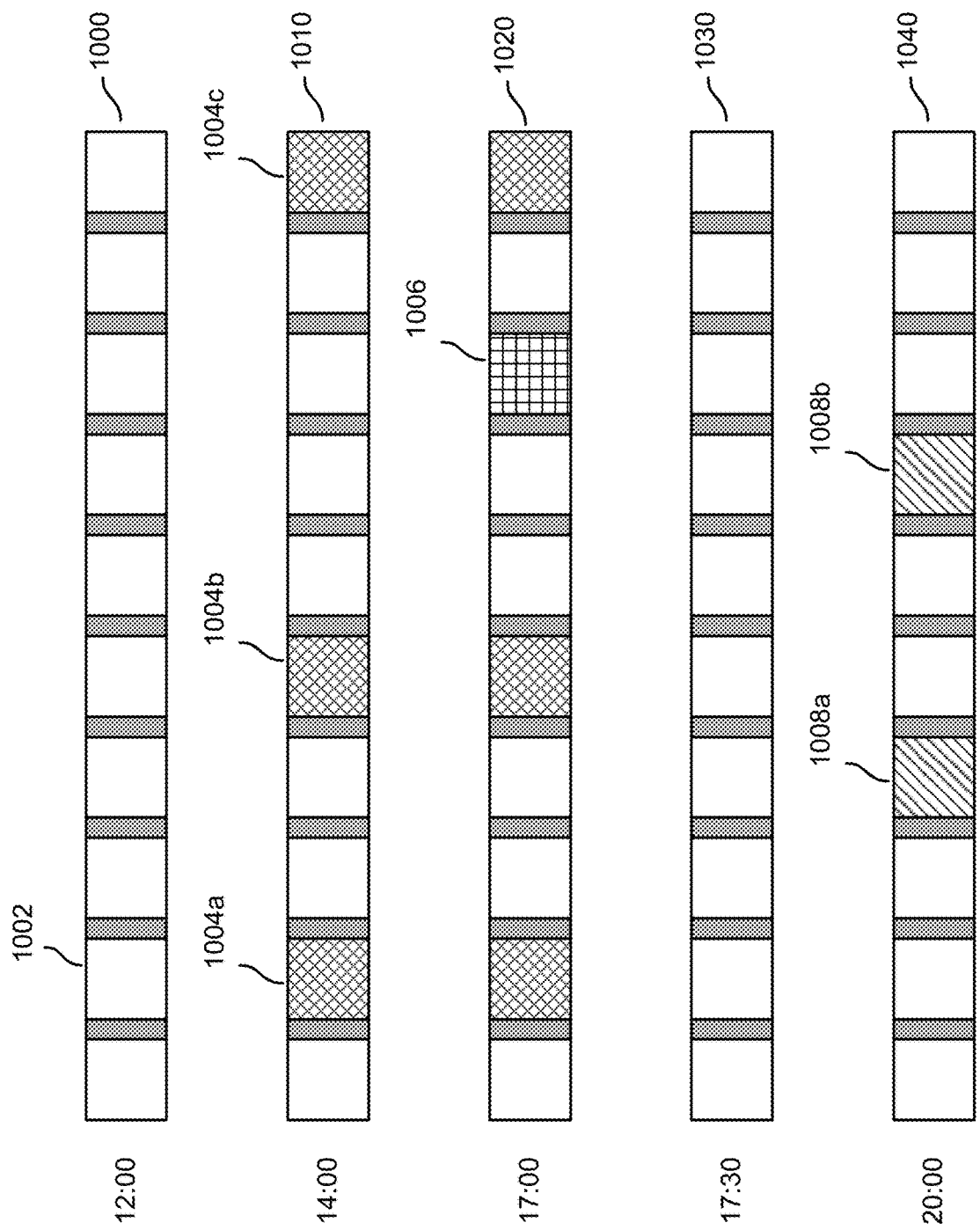
FIG. 10 is block diagram illustrating an embodiment of differential restore using block-based backups.

FIG. 10 is block diagram illustrating an embodiment of differential restore using block-based backups. In the example shown, a layout and/or image of a portion of a source volume (e.g., an F:\ drive, etc.) including multiple blocks 1002 is depicted at various times (e.g., 12:00, 14:00, 17:00, 18:00, and 20:00). The layouts and/or images of the source volume may include a visual depiction of the block change information tracked by a CBT engine and stored in a block changing information data structure. At 12:00, a full backup may be performed, and the image and/or layout of the source volume at 12:00 1000 indicates that no blocks have changed (e.g., unchanged blocks are shown white). The layout of the source volume at 14:00 1010 indicates that three (3) blocks 1004a, 1004b, 1004c have changed relative to the backup at 12:00. The layout of the source volume at 17:00 1020 indicates that one (1) block 1006 changed between 17:00 and 14:00. The layout of the source volume at 17:00 1020 depicts four (4) blocks in the portion of the source volume depicted have changed relative to the last backup at 12:00. In various embodiments, this block change information may be tracked and/or stored by a CBT engine.

In one example, a restore operation may be initiated at 17:30 to restore the source volume to its state at the 12:00 full backup (e.g., a backup time of 12:00). The restore operation may be initiated by an end user (e.g., associated with source volume), administrator, as a result of any automatic process, and/or in any other manner. Using the approaches discussed herein it may be determined (e.g., based on block change information) that four (4) blocks in the source volume have changed since the target restore time 12:00. It may be determined that the number of changed blocks is equal to or less than a threshold (e.g., four (4) blocks), and a differential restore operation may be initiated. In the differential restore operation, block restore information may be generated identifying the changed blocks 1004a, 1004b, 1004c, 1006. The block restore information may be provided to a backup storage node. Backup data associated with identified changed blocks may be retrieved (e.g., from a backup volume) and/or provided to the source node. The backup data may, for example, include blocks corresponding to each of the changed blocks. The corresponding blocks may include blocks copied to the backup volume during the 12:00 backup operation. To restore the source volume to its state at 12:00 the changed blocks may be replaced with the corresponding blocks included in the backup data. The replacement blocks may then be concatenated and/or stitched into the surrounding (e.g., adjacent) blocks in the source volume. In this case, the blocks in the source volume that did not change (e.g., shown as white blocks) between the restore time 17:30 and the backup time 12:00 would not be replaced. As shown, the layout of the source volume at 17:30 1030 (e.g., after the completion of the restore operation) indicates that the source volume has been restored its state at 12:00, the target backup time.

Change block tracking may continue after 17:30. For example, the layout of the source volume at 20:00 indicates that two (2) blocks 1008*a*, 1008*b* have changed relative to the restore operation at 17:30.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining block restore information identifying blocks in a volume that have changed since a backup time, the block restore information based at least in part on stored block change information indicating monitored changes to blocks in the volume;
    providing the block restore information to a backup storage node, wherein the block restore information is used to retrieve backup data associated with the identified blocks;
    receiving an indication to perform a restore operation including an indication of a state of the volume to which the volume is to be restored;
    determining, in connection with a restore operation, whether to perform a differential restore or a full restore based at least in part on a measure of blocks in the volume that have changed in relation to the state of the volume to which the volume is to be restored, wherein the differential restore corresponds to a restoration of the blocks identified as corresponding to blocks in the volume that have changed since the backup time, and wherein the determining whether to perform the differential restore or the full restore comprises:
        determining whether a measure of the identified blocks in the volume that have changed since the backup time exceeds a threshold; and
    performing a restore operation based at least in part on the determination of whether to perform the differential restore or the full restore, wherein performing the restore operation comprises:
        in response to a determination that the measure of the identified blocks in the volume that have changed since the backup time is determined to exceed the threshold, perform a full restore including restoring an entire image of a backup corresponding to the volume; and
        in response to a determination that the measure of the identified blocks in the volume that have changed since the backup time is determined to not exceed the threshold, performing the differential restore including using the backup data to restore the volume to a state at the backup time by replacing the identified blocks with corresponding backup data.

2. The method of claim 1, wherein using the backup data to restore the volume comprises:
    replacing the identified blocks with corresponding blocks included in the backup data, wherein the corresponding blocks include blocks that were stored in the volume at the backup time.

3. The method of claim 2, further comprising:
    stitching at least one of the corresponding blocks to an adjacent block in the volume.

4. The method of claim 1, wherein the backup data comprises corresponding blocks stored in a backup volume, the corresponding blocks each corresponding to one of the identified blocks.

5. The method of claim 1, determining block restore information comprises:
    retrieving, from the stored block change information, information identifying blocks that have changed since the backup time; and
    generating block restore information comprising the retrieved information.

6. The method of claim 1, further comprising receiving an indication that the volume is to be restored to the state at the backup time.

7. The method of claim 1, further comprising:
    monitoring, by a change block tracking engine, changes to blocks in the volume;
    storing, in a change block tracking database, the block change information comprising identifiers associated with changed blocks and times associated with the changes to the blocks.

8. The method of claim 1, further comprising:
    receiving, at the backup storage node, the block restore information;
    mapping the blocks identified in the block change information to storage locations on a backup storage volume;
    retrieving backup data from the storage locations on the backup storage volume; and
    providing the backup data to a node associated with the volume.

9. The method of claim 1, further comprising: in an event that the measure of the identified blocks in the volume that have changed since the backup time is determined to exceed the threshold, providing, to a node associated with the volume, backup data comprising the entire image of the volume at the backup time.

10. The method of claim 1, wherein the performing the differential restore including using of the backup data to restore the volume to a state at the backup time by replacing the identified blocks with corresponding backup data comprises:
    stitching the corresponding backup data associated with the identified blocks into the volume.

11. The method of claim 10, wherein the stitching of the corresponding backup data into the volume comprises:
    stitching at least part of the corresponding backup data associated with the identified blocks to a block on the volume that was not replaced in connection with the differential restore.

12. The method of claim 1, wherein the performing the differential restore comprises: replacing only the identified blocks with corresponding backup data.

13. The method of claim 1, wherein the backup storage node retrieves the backup data associated with the identified blocks based at least in part on the block restore information.

14. A system, comprising:
    a processor; and
    a memory coupled with the processor, wherein the memory is configured to provide the processor with instructions which when executed cause the processor to:
        determine block restore information identifying blocks in a volume that have changed since a backup time, the block restore information based at least in part on stored block change information indicating monitored changes to blocks in the volume;
        provide the block restore information to a backup storage node, wherein the block restore information is used to retrieve backup data associated with the identified blocks;

receive an indication to perform a restore operation including an indication of a state of the volume to which the volume is to be restored;

determine, in connection with a restore operation, whether to perform a differential restore or a full restore based at least in part on a measure of blocks in the volume that have changed in relation to the state of the volume to which the volume is to be restored, wherein the differential restore corresponds to a restoration of the blocks identified as corresponding to blocks in the volume that have changed since the backup time, and wherein to determine whether to perform the differential restore or the full restore comprises:

determine whether a measure of the identified blocks in the volume that have changed since the backup time exceeds a threshold; and perform a restore operation based at least in part on the determination of whether to perform the differential restore or the full restore, wherein to perform the restore operation comprises:

in response to a determination that the measure of the identified blocks in the volume that have changed since the backup time is determined to exceed the threshold, perform a full restore including restoring an entire image of a backup corresponding to the volume;

in response to a determination that the measure of the identified blocks in the volume that have changed since the backup time is determined to not exceed the threshold, perform a differential restore including use the backup data in connection with a differential restore operation to restore the volume to a state at the backup time by replacing the identified blocks with corresponding backup data.

15. The system recited in claim 14, wherein the instructions to use the backup data to restore the volume include instructions to:

replace the identified blocks with corresponding blocks included in the backup data, wherein the corresponding blocks include blocks that were stored in the volume at the backup time.

16. The system recited in claim 14, wherein the memory is further configured to provide the processor with instructions which when executed cause the processor to:

monitoring, by a change block tracking engine, changes to blocks in the volume;

storing, in a change block tracking database, the block change information comprising identifiers associated with changed blocks and times associated with the changes to the blocks.

17. A computer program product, the computer program product being embodied in a tangible non-transitory computer readable storage medium and comprising computer instructions for: determining block restore information identifying blocks in a volume that have changed since a backup time, the block restore information based at least in part on stored block change information indicating monitored changes to blocks in the volume; providing the block restore information to a backup storage node, wherein the block restore information is used to retrieve backup data associated with the identified blocks; receiving an indication to perform a restore operation including an indication of a state of the volume to which the volume is to be restored; determining, in connection with a restore operation, whether to perform a differential restore or a full restore based at least in part on a measure of blocks in the volume that have changed in relation to the state of the volume to which the volume is to be restored, wherein the differential restore corresponds to a restoration of the blocks identified as corresponding to blocks in the volume that have changed since the backup time, and wherein the determining whether to perform the differential restore or the full restore comprises: determining whether a measure of the identified blocks in the volume that have changed since the backup time exceeds a threshold; and performing a restore operation based at least in part on the determination of whether to perform the differential restore or the full restore, wherein performing the restore operation comprises: in response to a determination that the measure of the identified blocks in the volume that have changed since the backup time is determined to exceed the threshold, perform a full restore including restoring an entire image of a backup corresponding to the volume; and in response to a determination that the measure of the identified blocks in the volume that have changed since the backup time is determined to not exceed the threshold, performing the differential restore including using the backup data in connection with a differential restore operation to restore the volume to a state at the backup time by replacing the identified blocks with corresponding backup data.

18. The computer program product recited in claim 17, wherein using the backup data to restore the volume comprises:

replacing the identified blocks with corresponding blocks included in the backup data, wherein the corresponding blocks include blocks that were stored in the volume at the backup time.

* * * * *